US008755415B2

(12) United States Patent
Cox

(10) Patent No.: US 8,755,415 B2
(45) Date of Patent: Jun. 17, 2014

(54) LASER AND OPTICAL AMPLIFIER

(75) Inventor: Alan Cox, Stockport (GB)

(73) Assignee: Laser Quantum Inc., San José, CA (US)

( * ) Notice: Subject to any disclaimer, the term of this patent is extended or adjusted under 35 U.S.C. 154(b) by 36 days.

(21) Appl. No.: 13/523,376

(22) Filed: Jun. 14, 2012

(65) Prior Publication Data

US 2012/0320935 A1    Dec. 20, 2012

(30) Foreign Application Priority Data

Jun. 16, 2011  (GB) .................................. 1110249.8
Jul. 25, 2011  (GB) .................................. 1112828.7

(51) Int. Cl.
| | |
|---|---|
| *H01S 3/30* | (2006.01) |
| *H01S 3/067* | (2006.01) |
| *H01S 3/08* | (2006.01) |
| *H01S 3/086* | (2006.01) |
| *H01S 3/091* | (2006.01) |
| *H01S 3/0933* | (2006.01) |
| *H01S 3/094* | (2006.01) |
| *H01S 3/0941* | (2006.01) |

(52) U.S. Cl.
CPC ............. *H01S 3/067* (2013.01); *H01S 3/06716* (2013.01); *H01S 3/06733* (2013.01); *H01S 3/06754* (2013.01); *H01S 3/08009* (2013.01); *H01S 3/08059* (2013.01); *H01S 3/086* (2013.01); *H01S 3/091* (2013.01); *H01S 3/0933* (2013.01); *H01S 3/094015* (2013.01); *H01S 3/0941* (2013.01)
USPC .................... 372/6; 372/69; 372/99; 372/102

(58) Field of Classification Search
CPC . H01S 3/067; H01S 3/06716; H01S 3/06733; H01S 3/06754; H01S 3/08009; H01S 3/08059; H01S 3/086; H01S 3/091; H01S 3/0933; H01S 3/094015; H01S 3/0941

USPC ................................................... 372/6, 69, 99
See application file for complete search history.

(56) References Cited

U.S. PATENT DOCUMENTS

| 5,553,088 A | 9/1996 | Brauch et al. |
|---|---|---|
| 6,751,241 B2 | 6/2004 | Davis et al. |

(Continued)

FOREIGN PATENT DOCUMENTS

| DE | 19735102 | 2/1998 |
|---|---|---|
| DE | 19925648 | 12/2000 |

(Continued)

OTHER PUBLICATIONS

Roser, F, e. a. "94 W 980 nm High Brightness Yb-doper Fiber Laser" 22 Optics Express, vol. 10, No. 22, Oct. 27, 2008, pp. 17310-17318.

(Continued)

*Primary Examiner* — Dung Nguyen
(74) *Attorney, Agent, or Firm* — Faegre Baker Daniels LLP

(57) ABSTRACT

An optical fiber laser or amplifier comprising an optical fiber and a pump radiation source configured to generate pump radiation which is received through an input end of the optical fiber. The optical fiber may include a doped core which is configured to guide the pump radiation and to generate or amplify and guide signal radiation when pump radiation passes through it. The optical fiber laser or amplifier may include a first reflector configured to reflect pump radiation and further comprises a second reflector configured to selectively reflect a portion of pump radiation. The selection of the portion of pump radiation to be reflected by the second reflector depends upon one or more of: the spatial position of the pump radiation, the direction of the pump radiation, and the polarization of the pump radiation.

20 Claims, 4 Drawing Sheets

(56) References Cited

U.S. PATENT DOCUMENTS

| | | | |
|---|---|---|---|
| 7,394,837 B2 * | 7/2008 | Shevy et al. | 372/6 |
| 2003/0063629 A1 | 4/2003 | Davis et al. | |
| 2007/0274665 A1 * | 11/2007 | Barbosa et al. | 385/142 |
| 2009/0010286 A1 * | 1/2009 | Messaddeq et al. | 372/6 |

FOREIGN PATENT DOCUMENTS

| | | |
|---|---|---|
| DE | 10025485 | 12/2001 |
| DE | 10214668 | 10/2003 |
| JP | 03135081 | 10/1991 |

OTHER PUBLICATIONS

Ylä-Jarkko, K.H. e. a. "A 3.5 W977nm Cladding-pumped Jacketed Air-Clad Ytterbium-Doped Fiber Laser", Proceedings of 18th Advanced Solid-State Photonics Topical Meeting San Antonio Feb. 2-5, 2003, 5 pgs.

Nilsson, J. e a. "Ring-doped Cladding-Pumped Single-Mode Athree-Level Fiber Laser", Optics Letter, vol. 23, No. 5, Sep. 30, 2997, pp. 355-357.

Boullet, Johan, e. a. "High Power Ytterbium-Doped Rod-Type Three Level Photonic Crystal Fiber Laser", Optics Express, vol. 16 No. 22, pp. 17891-17902.

Cieslack, R. e. a. "Efficient Intracavity Frequency Doubling of am Yb-Doped Fiber Laser Using an Internal Resonant Enhancement Cavity", Lasers and Electro-Optics and Quantum Electronics and Laser Science Conference, San Jose, US, May 2010, 2 pgs.

Zaouter, Yoann, e. a. "12 w, 350 FS Ultrashort Pulses From a Micro-Pulling Down Yb:YAS Single Crystal Fiber Amplhifier", Optics Express, Oct. 27, 2008, vol. 16 No. 22 pp. 17315-17316.

\* cited by examiner

LASER AND OPTICAL AMPLIFIER

RELATED APPLICATIONS

The present application claim priority to British Application No. 1112828.7, filed Jul. 25, 2011 and to British Application No. 1110249.8, filed Jun. 16, 2011, the disclosures of which are expressly incorporated by reference herein.

FIELD

The present invention relates to a laser and to an optical amplifier, and also to an optical fibre.

BACKGROUND

Fibre lasers and fibre amplifiers are well known and are widely used. One form of fibre laser (or amplifier) comprises a double-clad active optical fibre. A double-clad active fibre typically comprises a core, an inner cladding which surrounds the core, and an outer cladding which surrounds the inner cladding. The core is doped with an active dopant material and guides and amplifies signal radiation which travels along the fibre. The inner cladding is configured to receive and guide pump radiation along the fibre. Using the inner cladding to receive and guide the pump radiation allows lower brightness pump radiation to be used to pump the fibre (compared with the case if the pump radiation were to solely be received by the core).

It is desirable to provide a laser or optical amplifier which is novel and inventive over the known prior art.

SUMMARY

According to a first aspect of the invention there is provide an optical fibre laser or amplifier comprising an optical fibre and a pump radiation source configured to generate pump radiation which is received through an input end of the optical fibre, the optical fibre comprising a doped core located within cladding which is configured to guide the pump radiation, the doped core being configured to generate or amplify and guide signal radiation when pump radiation passes through it, wherein the optical fibre laser or amplifier further comprises a first reflector configured to reflect pump radiation which has travelled from the input end to an output end of the optical fibre, and further comprises a second reflector configured to selectively reflect a portion of pump radiation which has travelled from the output end to the input end of the optical fibre, wherein the selection of the portion of pump radiation to be reflected by the second reflector depends upon one or more of: the spatial position of the pump radiation, the direction of the pump radiation, and the polarisation of the pump radiation.

The second reflector may be configured to reflect a smaller fraction of the pump radiation as it first passes in the direction from the pump radiation source to the optical fibre, than the fraction of the pump radiation that is reflected by the second reflector after it has travelled along the optical fibre to the second reflector.

The second reflector may be configured to reflect at least 25% of the pump radiation which has travelled from the output end to the input end of the optical fibre.

The second reflector may be configured to reflect at least 50% of the pump radiation which has travelled from the output end to the input end of the optical fibre.

The second reflector may be configured to reflect at least 70% of the pump radiation which has travelled from the output end to the input end of the optical fibre.

The second reflector may be configured to reflect at least 80% of the pump radiation which has travelled from the output end to the input end of the optical fibre The second reflector may comprise a non-reflective area which is configured to allow pump radiation which has a particular spatial position and/or direction to pass from the pump radiation source into the optical fibre.

The non-reflective area may be an opening in the second reflector, or a transmissive area in the second reflector, a space located adjacent to the second reflector, or a transmissive area located adjacent to the second reflector.

The second reflector may be located away from an input face of the optical fibre.

A lens may be located between the second reflector and the input face of the optical fibre.

The second reflector may be provided on an input face of the optical fibre.

The reflective area of the second reflector may cover at least half of the surface area of the core and the cladding which surrounds the core.

The non-reflective area may have a shape which substantially corresponds to the shape of the pump radiation in the plane of the second reflector when the pump radiation has travelled from the pump radiation source to the second reflector.

The second reflector may comprise a plurality of reflectors which are connected via optical fibres to an input of the optical fibre.

The second reflector may comprise a polariser and a mirror.

Additional cladding may be provided around the cladding, the additional cladding having a lower refractive index than the cladding, and/or the additional cladding including air holes which extend along the optical fibre, or wherein the optical fibre is suspended in air.

The first reflector or the second reflector may be at least partially transmissive for signal radiation.

The pump radiation source may be a diode laser.

The fibre may be a double clad active optical fibre.

According to a second aspect of the invention there is provided an optical rod laser or amplifier comprising rod and a pump radiation source configured to generate pump radiation which is received through an input end of the rod, the rod comprising a doped material which is configured to guide the pump radiation, the rod being configured to generate or amplify signal radiation when the pump radiation passes through it, the signal radiation being unguided by the rod, wherein the rod laser or amplifier further comprises a first reflector configured to reflect pump radiation which has travelled from the input end to an output end of the rod, and further comprises a second reflector configured to selectively reflect a portion of pump radiation which has travelled from the output end to the input end of the rod, wherein the selection of the portion of pump radiation to be reflected by the second reflector depends upon one or more of: the spatial position of the pump radiation, the direction of the pump radiation, and the polarisation of the pump radiation.

The second aspect of the invention may optionally include one or more of the features of the first aspect of the invention listed above.

The second reflector may be configured to reflect a smaller fraction of the pump radiation as it first passes in the direction from the pump radiation source to the rod, than the fraction of the pump radiation that is reflected by the second reflector after it has travelled along the rod to the second reflector.

The second reflector may be configured to reflect at least 25% of the pump radiation which has travelled from the output end to the input end of the rod.

According to a third aspect of the invention there is provided an optical fibre comprising a doped core which is configured to generate signal radiation when pump radiation passes through the doped core and to guide the signal radiation, the optical fibre further comprising cladding which is configured to guide the pump radiation, wherein the optical fibre further comprises a first reflector configured to reflect pump radiation which has travelled from an input end to an output end of the optical fibre, and further comprises a second reflector configured to selectively reflect a portion of pump radiation which has travelled from the output end to the input end of the optical fibre, wherein the selection of the portion of pump radiation to be reflected by the second reflector depends upon one or more of: the spatial position of the pump radiation, the direction of the pump radiation, and the polarisation of the pump radiation.

The third aspect of the invention may optionally include one or more of the features of the first aspect of the invention listed above.

According to a fourth aspect of the invention there is provided an optical fibre laser or amplifier comprising an optical fibre and a pump radiation source configured to generate pump radiation which is received through an input end of the optical fibre, the optical fibre comprising a doped core located within cladding which is configured to guide the pump radiation, the doped core being configured to generate or amplify and guide signal radiation when pump radiation passes through it, wherein the optical fibre laser or amplifier further comprises a first reflector configured to reflect pump radiation which has travelled from the input end to an output end of the optical fibre, and further comprises a second reflector configured to reflect a portion of pump radiation which has travelled from the output end to the input end of the optical fibre, wherein the second reflector is configured to reflect a smaller fraction of the pump radiation as it first passes in the direction from the pump source to the optical fibre than the fraction of the pump radiation that is reflected by the second reflector after it has travelled along the optical fibre to the second reflector.

According to a fifth aspect of the invention there is provided an optical rod laser or amplifier comprising rod and a pump radiation source configured to generate pump radiation which is received through an input end of the rod, the rod comprising a doped material which is configured to guide the pump radiation, the rod being configured to generate or amplify signal radiation when the pump radiation passes through it, the signal radiation being unguided by the rod, wherein the rod laser or amplifier further comprises a first reflector configured to reflect pump radiation which has travelled from the input end to an output end of the rod, and further comprises a second reflector configured to reflect a portion of pump radiation which has travelled from the output end to the input end of the rod, wherein the second reflector is configured to reflect a smaller fraction of the pump radiation as it first passes in the direction from the pump source to the rod, than the fraction of the pump radiation that is reflected by the second reflector after it has travelled along the rod to the second reflector.

The fourth and fifth aspects of the invention may optionally include one or more of the features of the first aspect of the invention listed further above.

The second reflector of any of the aspects of the invention may be a combination of optics that together reflect the pump radiation (for example a lens and a mirror with an non-reflecting portion).

The ratio of reflection of radiation travelling in the direction from pump to optical fibre or rod compared with optical fibre to pump may be <0.8. The ratio may be <0.6. The ratio may be <0.4. The ratio may be <0.2.

DESCRIPTION

Figure 1A:
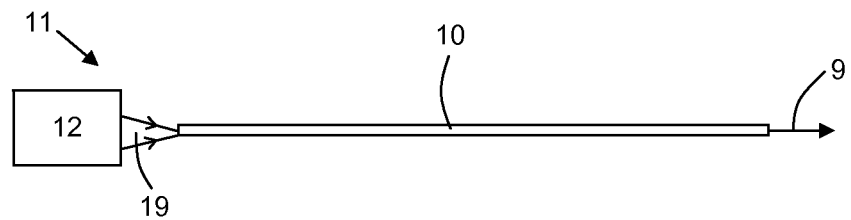
FIGS. 1a-c are schematic illustrations of a fibre laser according to an embodiment of the invention.
Figure 1B:
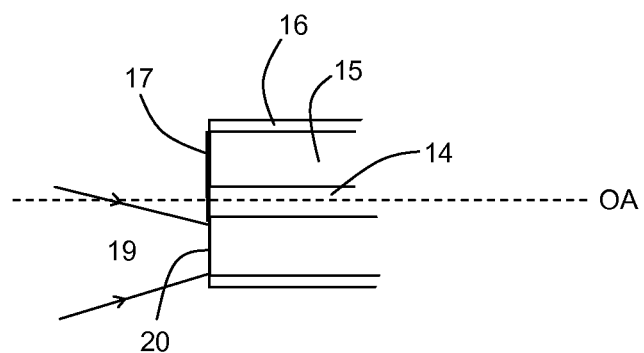
Figure 1C:
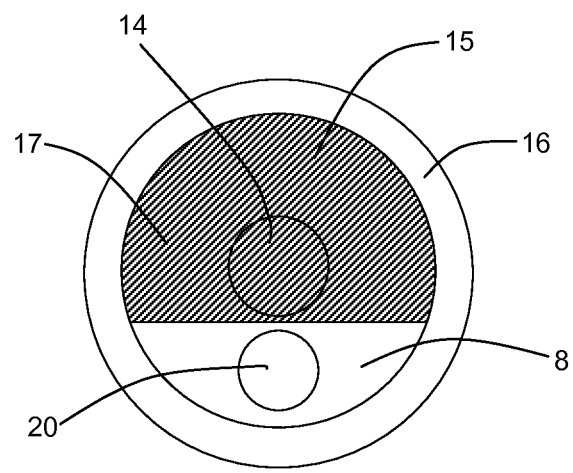

FIGS. 1a-c show a fibre laser 11 according to an embodiment of the invention. FIG. 1a schematically shows the fibre laser 11 viewed from one side, FIG. 1b shows an input end of an optical fibre of the fibre laser viewed from one side, and FIG. 1c shows an input face of the optical fibre. The fibre laser 11 comprises an optical fibre 10, which may be formed from silica or other suitable material. The optical fibre 10 is pumped by a diode laser 12. Pump radiation 19 passes into the optical fibre 10 and signal radiation 9 is emitted from the optical fibre. Signal radiation may be due to the fibre acting as a laser, or due to the fibre acting as an amplifier that is arranged to amplify seed radiation.

The optical fibre 10 is a double-clad active fibre. The optical fibre 10 comprises a doped core 14 which is surrounded by inner cladding 15, the inner cladding in turn being surrounded by outer cladding 16. The refractive index of the core 14 is greater than the refractive index of the inner cladding 15. The refractive index difference between the core 14 and the inner cladding 15 is sufficiently high to allow signal radiation 9 to be confined to the core by total internal reflection. The refractive index of the inner cladding 15 is greater than the refractive index of the outer cladding 16. The refractive index difference between the inner cladding 15 and the outer cladding 16 is sufficiently high to allow pump radiation 19 to be confined within the inner cladding (together with the core 14) by total internal reflection.

A reflective coating 17 is provided on the input face of the optical fibre 10. The reflective coating 17 covers part of the inner cladding 15 of the optical fibre and covers the core 14 of the optical fibre. Part of the inner cladding 15 is not covered by the reflective coating. This part is referred to hereafter as the non-reflective area 8. The non-reflective area 8 adjoins the reflective coating 17. The pump radiation 19 is directed towards the non-reflective area 8, and illuminates an area on the input face of the optical fibre which is hereafter referred to as the pumped area 20. As a result, pump radiation 19 from the diode laser 12 is launched into only part of the inner cladding 15.

A given ray of pump radiation 19 being launched into the optical fibre 10 will enter the optical fibre at a position on the input face of the optical fibre that can be denoted by x and y co-ordinates, and with direction that may be defined by a pair of angles relative to the input face. Generally, the pump radiation 19 will be launched effectively into the optical fibre 10 if the xy position on the input face is within the core 14 or inner cladding 15, and if the angle of the pump radiation is within acceptance angles of the optical fibre (assuming that the reflective coating 17 is not present on the input face). The acceptance angles of the optical fibre 10 depend upon its numerical aperture (NA), a larger NA providing a larger range of acceptance angles.

A beam of pump radiation will typically not impinge on the optical fibre 10 at a single xy position on the input face or from a single angular direction, but instead will impinge over an area on the input face and from a range of directions. A maximum amount of pump radiation (for a given brightness of pump radiation) may be launched into an optical fibre by arranging for the area illuminated by the pump radiation to correspond with all of the core and all of the inner cladding, and by arranging for the pump radiation to fill all of the acceptance angles of the optical fibre (this is the conventional approach). This is sometimes done by tailoring the optical fibre to have inner cladding shaped to correspond with the pump radiation beam. However bespoke optical fibre with shaped inner cladding is more difficult to manufacture and is therefore often relatively expensive. It is conventional to attempt to launch a maximum amount of pump radiation into an optical fibre because this maximises the amount of signal radiation generated As will be understood from the above description of the embodiment of the invention, the conventional approach of attempting to launch pump radiation into the core and all of the inner cladding of an optical fibre is not used by the embodiment of the invention. Instead, the pump radiation is launched into part of the inner cladding (pumped area 20 in FIG. 1c). The pump radiation 19 is of sufficient brightness that a desired amount of pump radiation can be launched into the optical fibre 10 without filling all of the acceptance area and/or all of the acceptance angles of the core 14 and inner cladding 15. The remainder of the input face is free to have the reflective coating 17 without interfering with coupling of the pump radiation 19 into the optical fibre 10.

Figure 2:
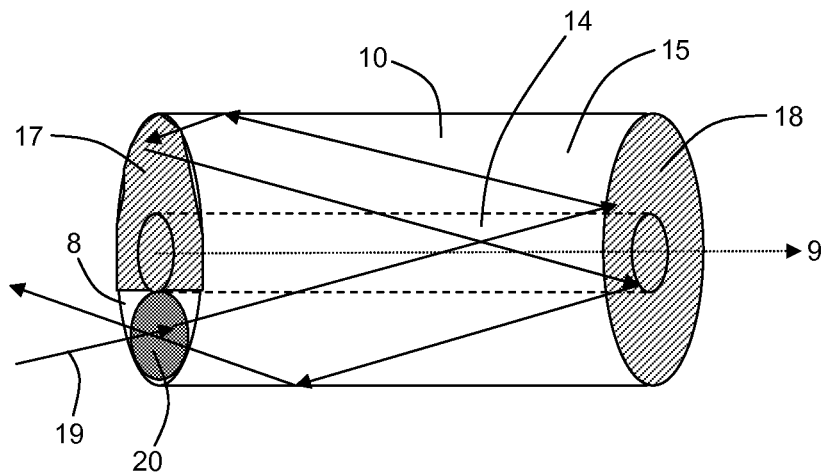
FIG. 2 schematically shows in more detail an optical fibre of the fibre laser of FIG. 1.

FIG. 2 is a schematic perspective view of the optical fibre 10 of the fibre laser, and schematically illustrates operation of the fibre laser. The outer cladding of the fibre laser 11 is omitted from FIG. 2 for ease of illustration. In addition to the reflective coating 17 which covers part of the pump receiving end of the optical fibre 10, a reflective coating 18 is provided on an opposite end of the optical fibre. The reflective coating 18 fully covers the core 14 and the inner cladding 15. In some embodiments the reflective coating 18 may partially cover the inner cladding 15 and/or the core 14. In some embodiments the reflective coating may be omitted from the core 14.

The pump radiation 19 is represented by a single ray which forms part of, and passes through, the pumped area 20. The pump radiation 19 passes through the non-reflective area 8 of the input face and into the optical fibre 10. Once the pump radiation 19 has entered the optical fibre 10 it propagates along the optical fibre, being retained within the inner cladding 15 by total internal reflection at the interface between the inner cladding and the outer cladding (not shown). The pump radiation 19 will pass through the doped core 14 as it travels along the optical fibre 10, and some of it will be absorbed. If a population inversion is achieved and there is enough gain through stimulated emission to overcome round-trip losses in the laser, lasing action will occur. The radiation emitted by the core 14, which is referred to here as the signal radiation 9, has a different (longer) wavelength than the pump radiation 19. The signal radiation 9 travels along the core 14, being retained within the core by total internal reflection at the interface between the core and the inner cladding 15. The cross-sectional dimensions and refractive indices of the core 14 may be such that the signal radiation 9 propagates along the optical fibre 10 as a guided mode (this may also apply for other embodiments of the invention). The guided mode may for example be a single transverse mode or a combination of low order modes. The signal radiation 9 passes out of the optical fibre 10 at a face which is opposite from the input face (this face is referred to hereafter as the output face). In an embodiment (not illustrated) the signal radiation may pass out of the input face of the optical fibre 10 (i.e. the face of the optical fibre that receives the pump radiation).

The reflective coating 18 is reflective to the pump radiation 19. Consequently, when the pump radiation 19 reaches the output face of the optical fibre 10 it is reflected back along the optical fibre (as is represented schematically by the ray in FIG. 2). The reflective coating 18 may be referred to as the first reflector, since it is the first reflector to reflect the pump radiation 19. The pump radiation 19 travels back along the optical fibre 10, again passing through the core 14 and stimulating the core to generate signal radiation 9. When the pump radiation 19 reaches the input face of the optical fibre 10, pump radiation which is incident upon the reflective coating 17 is reflected and again travels along the optical fibre 10. The reflected pump radiation causes additional stimulation of the core 14 and thus additional generation of signal radiation 9. Pump radiation 19 which is incident upon the non-reflective area 8 will pass out of the optical fibre 10 (as represented schematically by the ray in FIG. 2). This pump radiation 19 plays no further part in stimulating the core 14.

The reflective coating 17 and the non-reflective area 8 may together be considered to be a reflector which is configured to selectively reflect a portion of the pump radiation 19. This reflector may be referred to as the second reflector, since it is the second reflector to reflect the pump radiation 19. The selective reflection provided by the second reflector depends upon the spatial position of the pump radiation when it reaches the input end of the optical fibre 10. Pump radiation 19 which has a position that corresponds with the reflective coating 17 is reflected, whereas pump radiation which has a position that corresponds with the non-reflective area 8 is transmitted.

As will be understood from the above, the reflective coatings 17, 18 provided on the faces of the optical fibre 10 act to retain the pump radiation 19 within the optical fibre, and thereby increase the number of times (on average) that the pump radiation passes through the core 14 of the optical fibre. Since the pump radiation passes through the core 14 more times on average before leaving the fibre, more of the pump radiation is absorbed. The reflective coatings 17, 18 thus act to increase the efficiency of the fibre laser 11. In some embodiments the area of the reflective coating 17 can be >25%, >50% or even >70% of the core/clad area (defined as the area of the inner cladding plus the area of the core).

The coatings 17, 18 may be used to reflect at least part of the signal radiation 9 from ends of the optical fibre 10, thereby retaining that signal radiation within the optical fibre and promoting laser action within the optical fibre. One of the coatings 17, 18 may be made partially transmissive for the signal radiation 9, in order to allow some signal radiation to be coupled as an output from the optical fibre 10. For example, the reflective coating 18 on the output face of the optical fibre 10 may be partially transmissive, thereby allowing some signal radiation 9 to leave the optical fibre (as shown in FIG. 2).

The reflective coatings 17, 18 may for example comprise multi-layer coatings (e.g. a dielectric stack) which are configured to be reflective for pump radiation 19 and to be at least partially reflective for signal radiation 9.

The reflective coating 17 at the input end of the optical fibre 10 may for example be formed from silver or some other metal.

In an alternative embodiment, a fibre Bragg grating may be used instead of the reflective coating 18 to reflect the pump radiation 19 at the output face of the optical fibre 10. The fibre Bragg grating may be written into the inner cladding 15 and core 14 of the optical fibre 10. The fibre Bragg grating may be considered to be an example of the first reflector.

In an alternative embodiment, instead of using the reflective coatings 17, 18 to reflect the signal radiation 9, the signal radiation may be reflected in some other way. For example, fibre Bragg gratings may be provided at ends of core of the optical fibre, the fibre Bragg gratings being configured to reflect the signal radiation (and to allow a proportion of the signal radiation to leave the optical fibre as an output). Where this is the case, the reflective coatings 17, 18 do not need to be reflective for signal radiation.

In a further alternative embodiment, instead of using fibre Bragg gratings to reflect the signal radiation, reflectors which are located away from the optical fibre may be used to reflect the signal radiation. The reflectors may for example be mirrors. In this context the term 'located away from' may be interpreted as meaning that the mirrors do not form part of the optical fibre.

In a further alternative embodiment, Fresnel reflection at the output end of the optical fibre may be used to reflect some signal radiation back along the optical fibre whilst allowing some signal radiation to leave the optical fibre. Where this is done, a coating, mirror or fibre Bragg grating may be provided at the input end of the optical fibre in order to reflect the signal radiation at the input end with a better efficiency than is provided by Fresnel reflection.

In an embodiment in which the reflective coating 17 on the input face of the optical fibre 10 is used to reflect the signal radiation 9, it may be desirable to cover the face of the core 14 with the reflective coating in order to achieve efficient reflection of the signal radiation (rather than for example partially covering the face of the core).

In an embodiment in which the reflective coating 17 on the input face of the optical fibre 10 is not used to reflect the signal radiation 9, no particular advantage arises from covering the face of the core 14 with the reflective coating. Therefore, some or all of the face of the core 14 may be left uncovered by the reflective coating 17.

In an embodiment, the optical fibre 10 may form part of an optical amplifier rather than a laser. Where this is the case reflectors configured to reflect the signal radiation may be omitted. Anti-reflection coatings which are configured to reduce Fresnel reflection of the signal radiation at faces of the optical fibre may be used.

Embodiments of the invention go against the conventional understanding that the entire input face of an optical fibre should be available to receive pump radiation for launching into the optical fibre. Instead, the optical fibre 10 is configured to receive pump radiation over only a limited area (non-reflective area 8), with the remaining area being reflective 17 and therefore acting to retain the pump radiation within the optical fibre once it has been launched into the optical fibre.

The increased efficiency provided by the invention may be understood by reference to a numerical example using an optical fibre length of 0.5 m of DC-200/40-PZ-Yb, available from NKT Photonics of Birkerød, Denmark. The optical fibre has a core diameter of approx 40 µm and an inner cladding diameter of 200 µm. If the optical fibre were to be pumped using pump radiation at 915 nm, this would give pump radiation absorption of ~3 db/m. If the pump radiation were to pass to the end of the 0.5 m fibre and then be reflected back to the input face (as is done in some known fibre lasers), this gives ~3 db absorption. That is, ~0.5 of the pump radiation is absorbed during a double pass of the optical fibre (a double pass may be considered to mean passage of the pump radiation from the input end to the output end of the optical fibre and then back to the input end).

In an embodiment, the optical fibre is provided with a reflective coating of the type shown in FIGS. 1 and 2. The non-reflective area of the input face of the optical fibre may be 20% of the total core and inner cladding area of the input face. As a result, around 20% of the returning pump radiation will be lost from the input face via transmission out of the input face of the optical fibre. However, around 80% of the returning pump radiation will be reflected back along the optical fibre.

On a second double pass of the optical fibre, half of the remaining pump radiation is again absorbed by the optical fibre. Therefore a total of 70% of the initial pump radiation has been absorbed by the optical fibre after two double-passes of the optical fibre.

After three double passes of the optical fibre 78% of the initial pump radiation has been absorbed by the optical fibre. After four double passes of the optical fibre 81.2% of the initial pump radiation has been absorbed by the optical fibre.

After an infinite number of passes of the optical fibre approximately 83.333% of the pump radiation is absorbed by the optical fibre, with 16.667% of the pump radiation being lost from the optical fibre. This assumes that reflection of the pump radiation at the output end of the optical fibre is perfect, and that pump radiation is not absorbed by the reflective coatings. The absorption and loss of pump radiation is set out below in Table 1 for 20 double passes of the optical fibre.

TABLE 1

| Number of Double Passes | Power at Start of Double Pass (% of initial power) | Power Absorbed during Double Pass (% of initial power) | Power Lost Upon Reflection at Input End |
|---|---|---|---|
| 1 | 100 | 50 | 10 |
| 2 | 40 | 20 | 4 |
| 3 | 16 | 8 | 1.6 |
| 4 | 6.4 | 3.2 | 0.64 |
| 5 | 2.56 | 1.28 | 0.256 |
| 6 | 1.024 | 0.512 | 0.1024 |
| 7 | 0.4096 | 0.2048 | 0.04096 |
| 8 | 0.16084 | 0.08192 | 0.016084 |
| 9 | 0.065536 | 0.032768 | 0.006554 |
| 10 | 0.0262144 | 0.0131072 | 0.002621 |
| 11 | 0.01048576 | 0.00524288 | 0.001049 |
| 12 | 0.004194304 | 0.002097152 | 0.000419 |
| 13 | 0.001677722 | 0.000838861 | 0.000168 |
| 14 | 0.000671089 | 0.000335544 | 6.71E−05 |
| 15 | 0.000268435 | 0.000134218 | 2.68E−05 |
| 16 | 0.000107374 | 5.36871E−05 | 1.07E−05 |
| 17 | 4.29497E−05 | 2.14748E−05 | 4.29E−06 |
| 18 | 1.71799E−05 | 8.58993E−06 | 1.72E−06 |
| 19 | 6.87195E−06 | 3.43597E−06 | 6.87E−07 |
| 20 | 2.74878E−06 | 1.37439E−06 | 2.75E−07 |
| TOTAL | | 83.33333242 | 16.66667 |

The 83% absorption of the pump radiation is significantly higher than pump radiation absorption that can be achieved by conventional means using an optical fibre of this length with this pump absorption coefficient, and is more than often is achievable in conventional 3-level fibre lasers (unless speciality fibres are used). A conventional fibre laser may be reflective for pump radiation at an output end of the optical fibre. In the above example this would lead to 50% absorption of the pump radiation. Therefore, compared with a conventional fibre laser, the embodiment of the invention provides a 66.6% increase of efficiency.

If a smaller non-reflective area were to be provided on the input face of the optical fibre, then the amount of pump radiation absorbed by the optical fibre would be increased accordingly. For example, if the non-reflective area were to be 10% of the total core and inner cladding area of the input face, then over 90% of the pump radiation absorption could be absorbed by the optical fibre.

The non-reflective area 8 may for example be less than half of the area of the core and the inner cladding at an input end of the optical fibre. The non-reflective area may for example be less than a third of the area of the core and the inner cladding at an input end of the optical fibre. The non-reflective area may for example be less than a quarter of the area of the core and the inner cladding at an input end of the optical fibre.

In the above example the pump radiation absorption of the optical fibre is ~3 dB/m and the length of the optical fibre is 0.5 m. Consequently, 50% of the pump radiation has been absorbed once the pump radiation has travelled to the output end of the optical fibre and back to the input end (a double pass of the pump radiation along the optical fibre). Other fibres may have different pump radiation absorption and/or a different length, and as a result the amount of pump radiation remaining in the optical fibre after a double pass may be different. Embodiments of the invention may provide a beneficial effect irrespective of the pump radiation absorption of the optical fibre. The beneficial effect provided by the invention increases as the pump radiation absorption of the optical fibre reduces. This is because, in the absence of the invention, a lower pump radiation absorption will lead to a higher intensity of pump radiation returning to the input end of the optical fibre and will therefore cause more pump radiation to be lost from the input end of the optical fibre. The invention reduces this loss of pump radiation.

Embodiments of the invention may for example be used in connection with an optical fibre which has pump radiation absorption of <6 dB per double pass of the pump radiation (i.e. passage of the pump radiation from the input end of the optical fibre to the output end and back to the input end). Embodiments of the invention may for example be used in connection with an optical fibre which has pump radiation absorption of <4 dB per double pass. Embodiments of the invention may for example be used in connection with an optical fibre which has pump radiation absorption of <2 dB per double pass. Embodiments of the invention may for example be used in connection with an optical fibre which has pump radiation absorption of <1 dB per double pass.

The improved efficiency demonstrated above for the embodiment of the invention shown in FIGS. 1 and 2 may also apply for embodiments described below.

Figure 3:
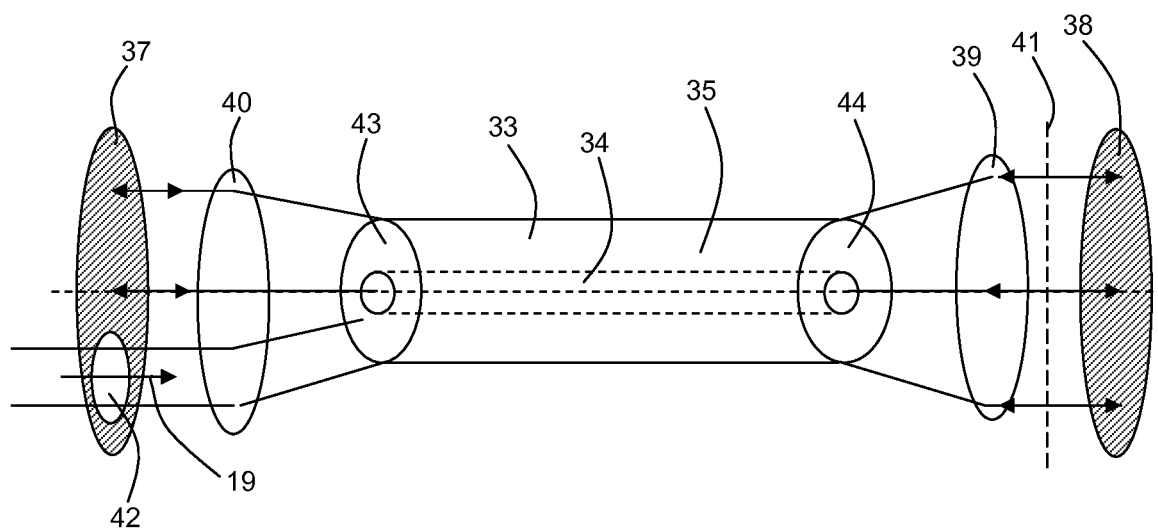
FIG. 3 is a schematic illustration of a fibre laser according to an alternative embodiment of the invention.

An alternative embodiment of the invention is shown schematically in FIG. 3. The fibre laser of the alternative embodiment of the invention comprises an optical fibre 33 having a core 34 and inner cladding 35. Outer cladding of the optical fibre 33 is omitted for ease of illustration. The fibre laser is pumped by pump radiation 19 which is generated by a diode laser (not illustrated). The optical fibre 33 is not provided with pump-reflecting coatings at its ends. Instead, separate reflectors 37, 38 are provided, the reflectors being located away from the optical fibre. The reflectors 37, 38 may for example be mirrors, or may be any other suitable reflective devices.

Referring first to an output end of the optical fibre 33, a lens 39 is located between the output face and the reflector 38. The lens 39 may be positioned such that the output face of the optical fibre 33 lies in the focal plane of the lens. Where this is the case, pump radiation 19 is collimated by the lens 39 before being incident upon the reflector 38 (as represented by rays in FIG. 3). Signal radiation is not shown in FIG. 3. However, the reflector 38 may be configured such that it is transmissive at the wavelength of the signal radiation, thereby allowing signal radiation to pass through the reflector. The reflector 38 may for example comprise a multi-layer coating which is configured to reflect pump radiation 19 and to transmit signal radiation. The reflector 38 may be referred to as the first reflector, since it is the first reflector to reflect the pump radiation.

At the input end of the optical fibre 33 the reflector 37 is provided with an opening 42 through which the pump radiation 19 passes. A lens 40 is located between the reflector 37 and the optical fibre 33. The lens 40 may be positioned such that an input face of the optical fibre lies in the focal plane of the lens 40. The lens 40 directs the pump radiation 19 into part of the inner cladding 35 of the optical fibre 33 through an input face 43 of the optical fibre. The pump radiation propagates along the optical fibre 33, being confined by total internal reflection at the interface between the inner cladding 35 and the outer cladding (not shown). The pump radiation may leave an output face 44 of the optical fibre 33, and may be reflected by the reflector 38 such that it re-enters the optical fibre 33. The reflector 38 may be referred to as the first reflector. When the pump radiation reaches the input face 43 of the optical fibre 33 it will pass through the lens 40 and in the direction of the reflector 37. A portion of this pump radiation will be selectively reflected from the reflector 37 and back towards the optical fibre 33, and a portion of this pump radiation will pass out of the opening 42. The reflector 37 and opening 42 may together be referred to as the second reflector. The pump radiation which is selectively reflected from the reflector 37 passes back into the optical fibre 33. The pump radiation thus passes along the optical fibre 33 a multiplicity of times, and thus facilitates efficient generation of signal radiation within the core 34.

Whether or not pump radiation will be reflected by the reflector 37 depends upon the direction of the rays of pump radiation as they leave the input face of the optical fibre 33. If the input face of the optical fibre 33 is at the focal point of lens 40, the angular distribution of radiation at the input face 43 of the optical fibre is transformed by the lens into a spatial distribution at the reflector 37. Pump radiation which has a direction that converts to the position of the opening 42 in the reflector 37 will pass through the opening. On returning from a double pass of the fibre, a relatively small portion (e.g. less than one quarter) of remaining pump radiation (that which has a direction that corresponds with the spatial position of the opening 42) will pass through the opening. The remaining portion is reflected from the reflective surface of the reflector 37 back into the fibre. This is an example of selective reflection of a portion of the pump radiation based upon the direction of the pump radiation.

The embodiment of the invention shown in FIG. 3 works in a similar manner to the embodiment shown in FIG. 2. The reflectors 37, 38 retain pump radiation within the optical fibre 33, thereby increasing the number of times on average that the pump radiation passes through the core 34. The core 34 is therefore stimulated to a greater degree than would otherwise be the case and therefore generates more signal radiation. The reflectors 37, 38 thus act to increase the efficiency of the fibre laser 31.

In an embodiment, a material which is transmissive to pump radiation may be provided in the reflector 37 instead of the opening 42.

Either or both of the reflectors 37, 38 may be reflective for signal radiation in addition to being reflective for pump radiation, thereby acting as laser end mirrors for a fibre laser formed using the optical fibre 33. One of the reflectors 37, 38 may be partially transmissive to the signal radiation, in order to allow some signal radiation to be coupled out. In an embodiment, Fresnel reflection of signal radiation at the faces 43, 44 of the optical fibre may act to reflect the signal radiation (e.g. instead of using reflectors 37, 38). In an embodiment, some other reflector may be used to reflect the signal radiation (e.g. instead of using reflectors 37, 38).

In an embodiment, the optical fibre 33 may form part of an optical amplifier. In this case the reflectors 37, 38 may be transmissive to signal radiation.

The opening 42 may be such that less than 70%, less than 50% or even less than 30% of the pump radiation reaching the reflector after returning from the optical fibre is allowed to pass though. The opening may be such that less than 20% of the pump radiation returning from the optical fibre is allowed to pass though.

In the embodiment shown in FIG. 3, the lens 40 is positioned such that an input face of the optical fibre 33 lies in the focal plane of the lens. In an alternative embodiment, the lens 40 may be positioned such that the input face of the optical fibre 33 does not lie in the focal plane of the lens. Where this is the case, the selective reflection provided by the second reflector 37, 42 may depend upon a combination of the direction and the spatial position of pump radiation when it passes out of the input face 43 of the optical fibre 33.

Figure 4:
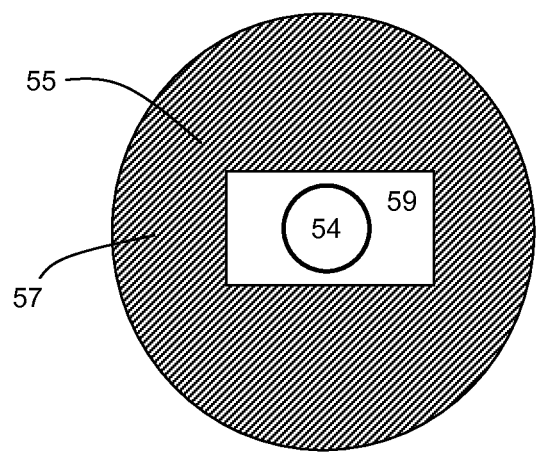
FIG. 4 is a schematic illustration of an input face of an optical fibre which may form part of an embodiment of the invention.

FIG. 4 schematically represents an input face of an optical fibre which may form part of an embodiment of the invention. The optical fibre comprises a core 54 and an inner cladding 55. The optical fibre may include an outer cladding, but this is omitted for ease of illustration. The input face of the optical fibre is provided with a reflective coating 57 which is reflective for pump radiation. A rectangular portion at the centre of the input face is not provided with the reflective coating 57. This is referred to hereafter as the rectangular non-reflective area 59. The reflective coating 57 and rectangular non-reflective area 59 may be considered to be an example of a second reflector. The rectangular non-reflective area 59 is larger than the core 54 and fully encompasses the core. In addition, the rectangular non-reflective area 59 extends across part of the inner cladding 55. The rectangular non-reflective area 59 substantially corresponds in shape with a diode laser generated pump radiation beam (not shown) that is incident upon the optical fibre. This may allow a greater proportion of pump radiation to be coupled into the optical fibre than would be the case if the non-reflective area 59 had a shape which did not substantially correspond with the pump radiation beam.

In an embodiment, the non-reflective area may have a shape which substantially corresponds with the shape of pump radiation generated by a pump radiation source other than a diode laser. In an embodiment, the shape of the pump radiation may be modified by a lens or other optics before it is incident upon the input face of the optical fibre. The non-reflective area may have a shape which substantially corresponds to the shape of the pump radiation in the plane of the second reflector.

In an embodiment, a waveplate may be used to rotate the polarisation of the pump radiation after it has exited the optical fibre and before it re-enters the optical fibre. If the optical fibre is polarisation preserving for pump radiation and has preferential pump absorption polarisation for a given polarisation direction, then this may allow additional stimulation of the core to occur which would otherwise not occur. Referring to FIG. 3, a quarter-wave plate 41 may for example be located between the output face of the optical fibre 33 and the reflector 38. For example, If horizontal linearly polarised pump radiation were to pass out of the output face of the optical fibre then the quarter-wave plate 41 would convert the polarisation of the pump radiation to circular polarisation before the pump radiation was incident upon the reflector 38. After reflection from the reflector 38 the pump radiation would again pass through the quarter-wave plate 41, whereupon the polarisation of the pump radiation would be converted to vertical linear polarisation. The pump radiation launched back into the optical fibre would therefore have a vertical linear polarisation.

Figure 5:
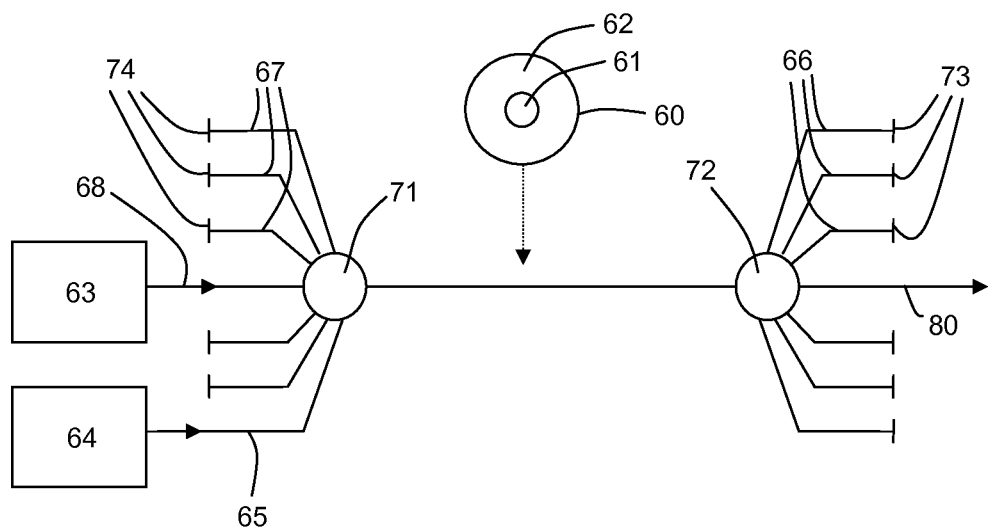
FIG. 5 is a schematic illustration of a fibre amplifier according to an alternative embodiment of the invention.

A further alternative embodiment of the invention is shown schematically in FIG. 5. The embodiment shown in FIG. 5 comprises an optical fibre 60 which comprises a doped core 61 surrounded by inner cladding 62, as may be seen from the cross-sectional view of the optical fibre. The optical fibre 60 may also include an outer cladding, but this is not shown in FIG. 5. The optical fibre 60 is configured to act as an optical amplifier, and amplifies signal radiation generated by a signal source 63 commonly referred to as a seed source. The signal radiation travels along a signal carrying optical fibre 68, and is then coupled to the core 61 of the optical fibre 60 by a 6+1:1 combiner 71. A pump radiation source 64 is configured to emit pump radiation which is coupled to an optical fibre (referred to hereafter as pump radiation fibre 65). The combiner 71 couples the pump radiation fibre 65 to the inner cladding 62 of the optical fibre 60 Pump radiation is delivered from the pump radiation source 64 via the pump fibre 65 into the inner cladding 62 of the optical fibre 60. The pump radiation propagates along the optical fibre 60 and passes through the doped core 61 and some of it is absorbed.

A 6+1:1 combiner 72 is provided at an output end of the optical fibre 60, the combiner connecting the optical fibre to an output fibre and to six pump reflecting fibres 66. Each pump reflecting fibre 66 is coupled to the inner cladding 62 of the optical fibre 60 by the combiner 72. Pump radiation passes from the inner cladding 62 into the pump reflecting fibres 66, is reflected by mirrors 73 provided at ends of the pump reflecting fibres, and passes back into the inner cladding of the optical fibre. The mirrors 73 may together be considered to be an example of a first reflector. Other reflective apparatus (e.g. fibre Bragg gratings) may be used instead of the mirrors 73.

Similarly, the combiner 71 provided at the input end of the optical fibre couples five pump reflecting fibres 67 to the inner cladding 62 at the input end of the optical fibre 60. Pump radiation passes from the inner cladding 62 into the pump reflecting fibres 67, is reflected by mirrors 74 provided at ends of the pump reflecting fibres, and passes back into the inner cladding of the optical fibre. The mirrors 74, with the combiner 71, may together be considered to be an example of a second reflector. Pump radiation which passes from the optical fibre 60 into the pump fibre 65 is substantially lost and does not further contribute to pumping of the optical fibre. The second reflector selectively reflects pump radiation based upon the spatial position of the pump radiation when it reaches the combiner (after having travelled along the optical fibre 60). Pump radiation which has a spatial position that causes it to couple to a pump reflecting fibre 67 is reflected back into the optical fibre 60, whereas pump radiation which has a spatial position that causes it to couple to the pump fibre 65 is not reflected back into the optical fibre.

Other reflective apparatus (e.g. fibre Bragg gratings) may be used instead of the mirrors 73 and 74.

On average the pump radiation passes a multiplicity of times along the optical fibre 60. This increases the efficiency of signal radiation generation by the optical fibre 60.

The combiners 71, 72 in this embodiment are configured to combine a signal-carrying fibre 68 and six additional fibres 65-67 with the optical fibre 60. Other combiners may be used to combine other numbers of fibres with the optical fibre 60. Although only a single pump radiation source 64 is used in the embodiment of FIG. 5, more than one pump radiation source may be used. More than one pump fibre may receive pump radiation prior to the pump radiation being coupled to the signal optical fibre. Fibres which are not pumped may beneficially have reflectors arranged at the fibre ends to reflect pump radiation.

It will be appreciated that combiner 72 could be replaced by alternative means of pump reflection such as multilayer dielectric coatings or fibre Bragg gratings.

Although described embodiments of the invention refer to double clad optical fibres which include an inner cladding and an outer cladding, in an embodiment the outer cladding may be omitted from the optical fibre. For example, the optical fibre may be suspended in the air and/or air-clad. Since air has a lower refractive index than the fibre, the pump radiation is confined in the inner cladding due to total internal reflection at the boundary between the inner cladding and the air. Suspending the optical fibre in air may increase the numerical aperture of the inner cladding (compared with a fibre having outer cladding). This may allow pump radiation focussed to a smaller area (having a higher numerical aperture) to be coupled into the optical fibre.

Figure 6:
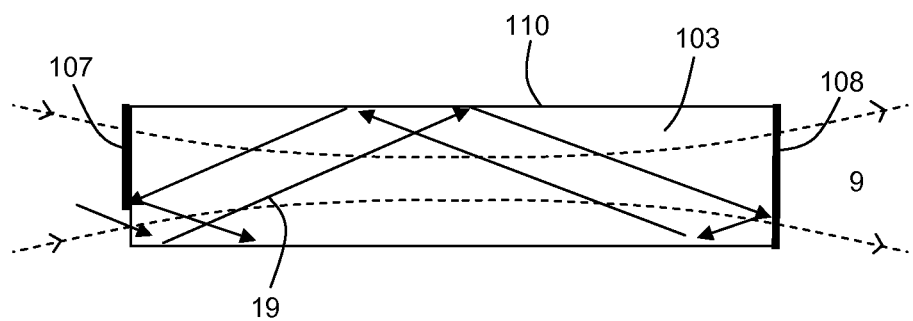
FIG. 6 is a schematic illustration of a rod laser or amplifier according to an alternative embodiment of the invention.

A further alternative embodiment of the invention is shown schematically in FIG. 6. The embodiment shown in FIG. 6 comprises a rod 103 rather than an optical fibre. The rod 103 may be circular in cross-section, or may have some other suitable cross-sectional shape. The rod 103 may be formed from silica or some other suitable material. The rod 103 may be considered to be a rod rather than an optical fibre because it has a larger cross-section and therefore is less flexible. The rod may further be considered not to be an optical fibre because it does not guide the signal radiation, but allows it to propagate without being guided by a core. The pump radiation, however, is guided by total internal reflection as shown. The total internal reflection which guides the pump radiation is provided by a refractive index step which occurs at sides 110 of the rod 103. The rod 103 may be located in air (or some other gas). Since this has a lower refractive index than the rod 103 it provides the refractive index step which guides the pump radiation. In an alternative embodiment (not shown), a cladding with a lower refractive index may be provided at the exterior of sides 110 of the rod 103, the refractive index difference between the rod and the cladding being sufficient that total internal reflection of the pump occurs at the boundary between them. Providing cladding in this manner would result in a structure which could be considered to be an optical fibre structure (although the structure will only guide the pump radiation and not the signal radiation).

The rod 103 is doped with a dopant which is configured to provide gain at a signal wavelength when stimulation at a pump wavelength occurs. Pump radiation 19 is introduced at an input face of the rod 103. A portion of the input face is provided with a reflective coating 107 which is configured to reflect pump radiation. The pump radiation 19 is introduced through a portion of the input face which is not provided with the reflective coating 107 (this may be referred to as a non-reflective area of the input face). A reflective coating 108 is provided at an output face of the rod 103, the reflective coating 108 also being configured to reflect pump radiation.

In use, the pump radiation 19 is introduced into the rod 103 through the non-reflective area of the input face. The pump radiation 19 is guided along the rod 103, guiding being provided by the refractive index step at sides 110 of the rod. The pump radiation is reflected from the reflective coating 108 on the output face of the rod 103 and travels back to the input face. The reflective coating 107 on the input face of the rod 103 selectively reflects the pump radiation based upon the spatial position of the pump radiation. Pump radiation which has a spatial position such that it is incident upon the reflective coating 107 is reflected, whereas pump radiation which as a spatial position such that it misses the reflective coating is transmitted.

The reflective coatings 107, 108 cause the pump radiation to travel on average a multiplicity of times along the rod 103 due to reflections at the reflective coatings 107, 108. This allows the dopant within the rod 103 to generate signal radiation 9 with a higher efficiency than would be the case if the pump radiation did not travel a multiplicity of times along the rod, due to increased absorption of the pump radiation. As is shown schematically in FIG. 6, the signal radiation 9 is not guided by the rod 103 (edges of the signal radiation are represented schematically by dotted lines).

The signal radiation 9 may be emitted from the rod 103 through the reflective coating 108 on the output end of the rod (the reflective coating may be transmissive for the signal radiation). In an embodiment, signal radiation 9 may also be emitted from the rod through the reflective coating 107 on the input end of the rod (which may also be transmissive for the signal radiation). In common with other embodiments of the invention, the rod embodiment may be particularly beneficial for 3-level systems or for 4-level systems and for a laser or an amplifier configuration.

In an embodiment, reflectors which are located away from the rod 103 may be used (e.g. in an arrangement which corresponds with that shown in FIG. 3).

The rod 103 may be configured as an optical amplifier or as a laser.

Embodiments of the invention may combine, with a rod, features mentioned further above in connection with fibre laser embodiments of the invention.

Figure 7:
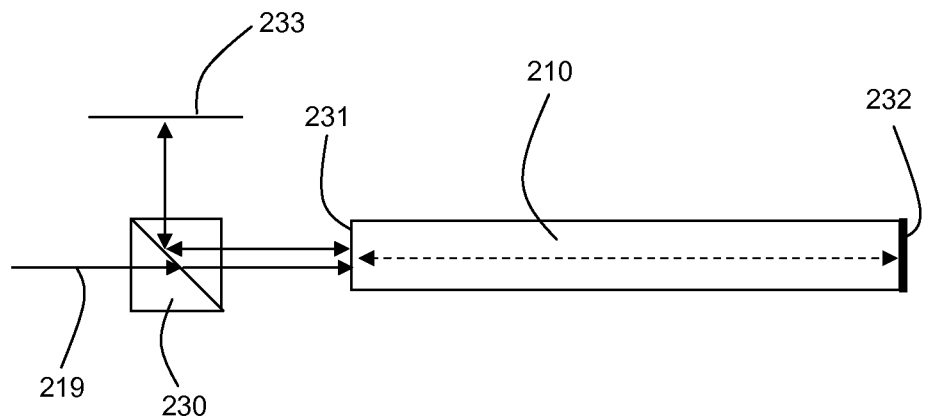
FIG. 7 is a schematic illustration of a fibre laser according to a further alternative embodiment of the invention.

An alternative embodiment of the invention is shown schematically in FIG. 7. A double clad optical fibre 210 receives and guides pump radiation 219, and generates signal radiation (not shown). The pump radiation travels through a polarising beam splitter cube 230 before being incident upon an input end 231 of the optical fibre 210. The pump radiation is substantially linearly polarised with a polarisation which allows it to be transmitted through the polarising beam splitter cube 230 without significant reflection. The input end 231 of the optical fibre 210 is not provided with a coating configured to reflect pump radiation, and the pump radiation 219 therefore passes into the optical fibre. The pump radiation 219 is guided along the optical fibre 210, causing signal radiation to be generated in a doped core of the optical fibre in the manner described further above. The pump radiation 219 is reflected from a reflective coating 232 provided at an output end of the optical fibre 210. The pump radiation 219 then travels back along the optical fibre 210 and leaves the optical fibre at the input end 231. The polarisation of the pump radiation 219 is not preserved by the optical fibre 210, and as a result the pump radiation is not polarised when it leaves the optical fibre.

When the pump radiation 219 is incident upon the polarising beam splitter cube 230, pump radiation which is polarised orthogonally to the originally injected pump radiation is reflected by the beam splitter cube, and pump radiation which is polarised in the same plane as the originally injected pump radiation is transmitted by the beam splitter cube. The pump radiation that is reflected by the polarising beam splitter is reflected by a mirror 233 and passes back to the beam splitter cube 230. The pump radiation 219 is again reflected by the beam splitter cube 230 and therefore travels back towards the input end 231 of the optical fibre 210. The pump radiation passes back into the optical fibre 210 where it again causes signal radiation to be generated.

After each double pass of the pump radiation through the optical fibre 210 some pump radiation is reflected by the polarising beam splitter cube 230 and passes back into the optical fibre. This provides more efficient generation of signal radiation than would be the case if pump radiation were not coupled back into the optical fibre 210. If the optical fibre 210 causes the pump radiation 219 to become fully depolarised as it travels along the optical fibre, then the polarising beam splitter cube 230 will reflect 50% of the pump radiation which is incident upon it from the optical fibre. Therefore, approximately 50% of pump radiation will be coupled back into the optical fibre 210 after each double pass of the optical fibre.

The reflection of the pump radiation by the polarising beam splitter cube 230 is selective reflection which depends upon the polarisation of the pump radiation. Some other polariser may be used instead of the polarising beam splitter cube 230. The polarising beam splitter cube 230 and the mirror 233 may together be considered to be an example of a second reflector configured to selectively reflect a portion of pump radiation depending upon the polarisation of the pump radiation.

Figure 8:
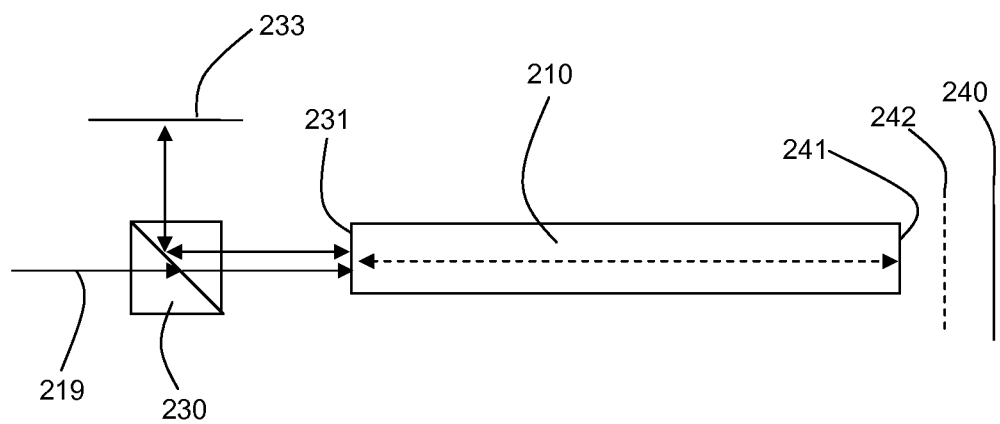
FIG. 8 is a schematic illustration of a fibre laser according to a further alternative embodiment of the invention.

A further alternative embodiment is shown schematically in FIG. 8. A substantial part of this embodiment corresponds with the embodiment shown in FIG. 7. However, in this embodiment the optical fibre 210 is polarisation preserving. The reflective coating 232 is omitted, and the first reflector instead is a mirror 240 which is located away from an output face 241 of the optical fibre. A quarter-wave plate 242 is located between the optical fibre 210 and the mirror 240.

In use, pump radiation 219 is substantially linearly polarised with a polarisation which allows it to be transmitted through the polarising beam splitter cube 230 without significant reflection. The pump radiation 219 retains this polarisation as it travels along the optical fibre 210 and leaves the output face 241 of the optical fibre with this polarisation. The pump radiation passes through the quarter-wave plate 242, is reflected by the mirror 240, and then passes back through the quarter-wave plate. This rotates the polarisation of the pump radiation through 90 degrees. The pump radiation therefore re-enters the optical fibre 210 with polarisation which is transverse to the original polarisation of the pump radiation. As a result, when the pump radiation passes out of the optical fibre 210 and is incident upon the polarising beam splitter cube 230 it is reflected towards the mirror 233. The pump radiation is reflected by mirror 233 back to the polarising beam splitter cube 230, from where it is reflected back into the optical fibre 210. The pump radiation travels along the optical fibre 210 and again passes through the quarter-wave plate 242. The pump radiation is reflected by the mirror 240 and travels back through the quarter-wave plate 242. As a result, the polarisation of the pump radiation is now the same as its initial polarisation. The pump radiation travels along the optical fibre 210 once more and is then incident upon the polarising beam splitter cube 230. The pump radiation passes through the beam splitter cube 230 and consequently does not re-enter the optical fibre 210.

The embodiment of the invention shown in FIG. 8 causes the pump radiation to undergo two double-passes of the optical fibre 210. The pump radiation therefore provides more efficient generation of signal radiation than would have been the case if a conventional arrangement had been used.

An additional reflector may be provided (not shown) for the embodiment shown in FIG. 7 or the embodiment shown in FIG. 8 (or some other embodiment which uses polarisation dependent reflection). The additional reflector may be configured to selectively reflect a portion of pump radiation which has travelled from the optical fibre through the polarising beam splitter cube (or other polarisation dependent reflector). The selection of the portion of pump radiation to be reflected by the additional reflector may depend upon one or more of the spatial position of the pump radiation or the direction of the pump radiation. The additional reflector may, together with the polarising beam splitter cube 230 and the mirror 233 be considered to be an example of a second reflector.

An optical isolator may be located between the optical fibre or rod and the pump radiation source, in order to eliminate or reduce the possibility of pump radiation travelling back to the pump radiation source and causing instability or even damage of the pump radiation source.

It has been noted by Nilsson et al that in a single-end pumped Ytterbium fibre laser operating at 975 nanometers a substantial amount of unwanted gain is seen at 1030 nanometers. The power of pump radiation which can be delivered into the optical fibre is limited because increasing the power of the pump radiation will tend to increase the amount of radiation generated at the unwanted 1030 nanometer wavelength. Causing the pump radiation to travel a multiplicity of times through the optical fibre using embodiments of the invention allows more pump absorption and has the effect if increasing pump brightness. This is beneficial for 3-level systems as the ratio of gain at 975 nm to gain at 1030 nm can be maximised. Embodiments of the invention may provide a similarly advantageous performance for other 3-level optical fibre lasers or optical fibre amplifiers. Embodiments of the invention may provide a similar advantage in 4-level optical fibre lasers or optical fibre amplifiers (or equivalently to rods).

Embodiments of the invention may allow optical fibres or rods with less doping to be used. This is because the multiplicity of passes of the pump radiation along the optical fibre allows a desired amount of signal radiation to be generated in the presence of a lower amount of doping. Reducing the amount of doping has the advantage that it can reduce the extent to which photo-darkening occurs.

It is sometimes desirable to absorb as much of the pump radiation as possible without requiring too long a fibre (perhaps due to nonlinear effects in the fibre or re-absorption of the laser radiation or seed signal confined in the core due to spontaneous absorption). Embodiments of the invention may allow this to be achieved. Embodiments of the invention may allow a shorter length of optical fibre (or rod) to be used whilst still achieving a desired degree of absorption of the pump radiation.

The optical fibre of embodiments of the invention may for example be less than 10 cm, 20 cm or less than 50 cm long. The optical fibre, however, may for example be up to 100 m long (for example in cases where the optical absorption in the fibre is low). An appropriate length for the optical fibre may be selected by deciding what amount of pump radiation is to be absorbed during a double pass of the optical fibre, then calculating what length of optical fibre will provide that absorption (taking into account the pump absorption per meter of the optical fibre). On taking into account the beneficial effects described in these embodiments, the optical fibre may be substantially shorter than would conventionally be required.

The optical fibre may for example be formed from silica, or some other suitable host material. In the case of the rod arrangement, crystals such as (but not limited to) YAG, $YVO_4$, $GdVO_4$, YLF may be used.

The dopant used in the optical fibre or rod of embodiments of the invention may for example be one or more of erbium, ytterbium, neodymium, dysprosium, praseodymium, and thulium (or some other suitable dopant).

The optical fibre may for example have a core diameter of up to 10 μm, up to 15 μm, up to 30 μm, up to 40 μm or more. The inner cladding of the optical fibre may for example have a diameter of up to 70 μm, up to 105 μm, up to 135 μm, up to 150 μm, up to 200 μm or more (where the diameter includes the core). The outer cladding of the optical fibre may for example have a diameter of up to 170 μm, up to 280 μm, up to 330 μm, up to 450 μm or more (where the diameter includes the inner cladding and the core).

The optical fibre may be air-clad, or a structured fibre including multiple air holes extending along the fibre (such as 'leakage channel fibre'). The optical fibre may be (but is not limited to) a photonic crystal fibre, depressed clad, hollow, ring-doped, 'W'-type, or photonic bandgap fibre which may be arranged in order to add distributed filtering for unwanted wavelengths. The optical fibre could additionally have angled Bragg gratings in order to filter out unwanted radiation and may also consist of a number of optical fibres spliced together to include a mixture of beneficial properties. For example, Bragg gratings are often written in photosensitive optical fibres doped with germanium rather than the active optical fibre itself.

The optical fibre (or rod) of embodiments of the invention may be configured to generate signal radiation at around 976 nm. Frequency doubling apparatus may be provided to frequency double the radiation in order to produce 488 nm radiation.

The rod may for example have a diameter of <200 μm, <500 μm or <1000 μm. The rod may have a diameter of >1000 μm.

In an embodiment of the invention, the second reflector is configured such that at least 25% of the pump radiation which has travelled from the output end to the input end of the optical fibre (or rod) is reflected by the second reflector. In an embodiment of the invention, at least 50% of the pump radiation which has travelled from the output end to the input end of the optical fibre (or rod) is reflected by the second reflector. In an embodiment of the invention, at least 70% of the pump radiation which has travelled from the output end to the input end of the optical fibre (or rod) is reflected by the second reflector. In an embodiment of the invention, at least 80% of the pump radiation which has travelled from the output end to the input end of the optical fibre (or rod) is reflected by the second reflector.

The second reflector may reflect a greater percentage of pump radiation at the input end of the optical fibre (or rod) than would be reflected by Fresnel reflection.

The second reflector will typically reflect a smaller fraction of the pump radiation as it first passes in the direction from the pump source to the optical fibre than the fraction of the pump radiation that is reflected by the second reflector after it has travelled along the optical fibre to the second reflector (for example, referring to FIG. 2, the fraction of pump radiation 19 travelling from left to right which is reflected by the second reflector is smaller than the fraction of pump radiation travelling from right to left which is reflected by the second reflector). This is due to the second reflector being chosen to reflect a different amount of pump radiation depending on its spatial position on the second reflector, or its polarisation state as it reaches the second reflector, or its direction as it reaches the second reflector (or any combination of these). In this context the 'second reflector' could refer to a combination of optics that together perform this task (for example a lens and a mirror with an non-reflecting portion). In an embodiment the ratio of reflection of radiation travelling in the direction from pump to optical fibre compared with reflection of radiation travelling in the direction from optical fibre to pump is <0.8, <0.6 or <0.4 or even <0.2. These ratios may provide a highly beneficial effect.

In general, the second reflector may use one or more of the spatial position of the pump radiation, the direction of the pump radiation, and the polarisation of the pump radiation to selectively reflect a portion of pump radiation.

In addition to the various second reflectors described above, the second reflector may have any other suitable form. The second reflector may for example be a fibre loop reflector, i.e. an optical fibre arranged in a loop such that radiation enters an input face of the optical fibre travelling in a first direction and leaves an output face of the optical fibre travelling in substantially the opposite direction.

An optical fibre laser which embodies the invention may be used as part of an apparatus configured to provide frequency doubling of signal radiation emitted by the optical fibre laser. The apparatus may use second harmonic generation in an LBO crystal (or other suitable crystal).

The above embodiments are shown by way of example. Optical arrangements taken from specific embodiments may be combined with one another. Some of these combinations may provide effects which are more beneficial than those provided by the embodiments themselves.

The invention claimed is:

1. An optical fibre laser or amplifier comprising an optical fibre and a pump radiation source configured to generate pump radiation which is received through an input end of the optical fibre, the optical fibre comprising a doped core located within cladding which is configured to guide the pump radiation, the doped core being configured to generate or amplify and guide signal radiation when pump radiation passes through it, wherein the optical fibre laser or amplifier further comprises a first reflector configured to reflect pump radiation which has travelled from the input end to an output end of the optical fibre, and further comprises a second reflector configured to selectively reflect a portion of pump radiation which has travelled from the output end to the input end of the optical fibre, wherein a selection of the portion of pump radiation to be reflected by the second reflector depends upon at least one of: a spatial position of the pump radiation, a direction of the pump radiation, and a polarisation of the pump radiation.

2. The optical fibre laser or amplifier of claim 1, wherein the second reflector is configured to reflect a smaller fraction of the pump radiation as it first passes in the direction from the pump radiation source to the optical fibre, than the fraction of the pump radiation that is reflected by the second reflector after it has travelled along the optical fibre to the second reflector.

3. The optical fibre laser or amplifier of claim 1, wherein the second reflector is configured to reflect at least 25% of the pump radiation which has travelled from the output end to the input end of the optical fibre.

4. The optical fibre laser or amplifier of claim 1, wherein the second reflector is configured to reflect at least 50% of the pump radiation which has travelled from the output end to the input end of the optical fibre.

5. The optical fibre laser or amplifier of claim 1, wherein the second reflector comprises a non-reflective area which is configured to allow pump radiation which has a particular spatial position and/or direction to pass from the pump radiation source into the optical fibre.

6. The optical fibre laser or amplifier of claim 5, wherein the non-reflective area is an opening in the second reflector, or a transmissive area in the second reflector, a space located adjacent to the second reflector, or a transmissive area located adjacent to the second reflector.

7. The optical fibre laser or amplifier of claim 1, wherein the second reflector is located away from an input face of the optical fibre.

8. The optical fibre laser or amplifier of claim 7, wherein a lens is located between the second reflector and the input face of the optical fibre.

9. The optical fibre laser or amplifier of claim 6, wherein the second reflector is provided on an input face of the optical fibre.

10. The optical fibre laser or amplifier of claim 9, wherein the reflective area of the second reflector covers at least half of the surface area of the core and the cladding which surrounds the core.

11. The optical fibre laser or amplifier of claim 6, wherein the non-reflective area has a shape which substantially corresponds to the shape of the pump radiation in the plane of the second reflector when the pump radiation has travelled from the pump radiation source to the second reflector.

12. The optical fibre of any of claim 1, wherein the second reflector comprises a plurality of reflectors which are connected via optical fibres to an input of the optical fibre.

13. The optical fibre laser or amplifier of claim 1, wherein the second reflector comprises a polariser and a mirror.

14. The optical fibre laser or amplifier of claim 1, wherein an additional cladding is provided around the cladding, the additional cladding having a lower refractive index than the cladding, and/or the additional cladding including air holes which extend along the optical fibre, or wherein the optical fibre is suspended in air.

15. The optical fibre laser or amplifier of claim 1, wherein the first reflector or the second reflector is at least partially transmissive for signal radiation.

16. The optical fibre laser or amplifier of claim 1, wherein the pump radiation source is a diode laser.

17. An optical rod laser or amplifier comprising rod and a pump radiation source configured to generate pump radiation which is received through an input end of the rod, the rod comprising a doped material which is configured to guide the pump radiation, the rod being configured to generate or amplify signal radiation when the pump radiation passes through it, the signal radiation being unguided by the rod, wherein the rod laser or amplifier further comprises a first reflector configured to reflect pump radiation which has travelled from the input end to an output end of the rod, and further comprises a second reflector configured to selectively reflect a portion of pump radiation which has travelled from the output end to the input end of the rod, wherein a selection of the portion of pump radiation to be reflected by the second reflector depends upon one or more of: a spatial position of the pump radiation, a direction of the pump radiation, and a polarisation of the pump radiation.

18. The optical rod laser or amplifier of claim 17, wherein the second reflector is configured to reflect a smaller fraction of the pump radiation as it first passes in the direction from the pump radiation source to the rod, than the fraction of the pump radiation that is reflected by the second reflector after it has travelled along the rod to the second reflector.

19. The optical fibre laser or amplifier of claim 17, wherein the second reflector is configured to reflect at least 25% of the pump radiation which has travelled from the output end to the input end of the rod.

20. An optical fibre comprising a doped core which is configured to generate signal radiation when pump radiation passes through the doped core and to guide the signal radiation, the optical fibre further comprising cladding which is configured to guide the pump radiation, wherein the optical fibre further comprises a first reflector configured to reflect pump radiation which has travelled from an input end to an output end of the optical fibre, and further comprises a second reflector configured to selectively reflect a portion of pump radiation which has travelled from the output end to the input end of the optical fibre, wherein a selection of the portion of pump radiation to be reflected by the second reflector depends upon one or more of: a spatial position of the pump radiation, a direction of the pump radiation, and a polarisation of the pump radiation.

* * * * *